July 5, 1949.  L. F. HEDGER  2,474,943
INSIDE-CAR TRAY HOLDER
Filed Dec. 14, 1948
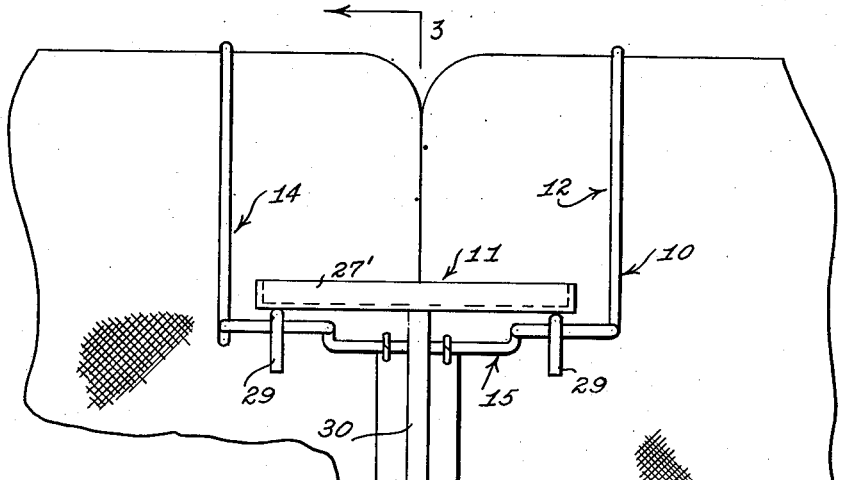
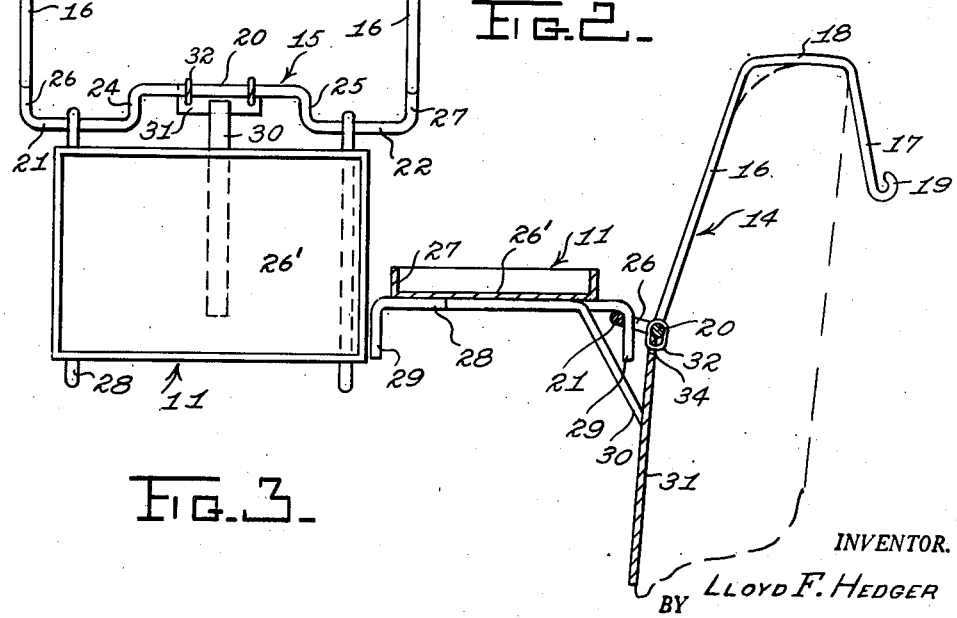
INVENTOR.
Lloyd F. Hedger
BY
McMorrow, Berman & Davidson
ATTORNEYS Patented July 5, 1949

2,474,943

UNITED STATES PATENT OFFICE 2,474,943

INSIDE CAR TRAY HOLDER

Lloyd F. Hedger, Atlanta, Ga.

Application December 14, 1948, Serial No. 65,095

4 Claims. (Cl. 311—21)

This invention relates to an improved serving tray for use in automobiles or other vehicles, and more particularly to a serving tray support for engagement on the back of the vehicle seat.

It is an object of this invention to provide a tray supporting means of the kind to be more particularly described hereinafter, which may be used within the vehicle by engagement over the back of the seat, whereby the tray may be supported suitably close to the occupants to provide for the ready access to the tray and articles, as fruit, supported on the tray.

Another object of this invention is to provide a lightweight frame member for engagement over the back of an automobile seat having provision for attaching and supporting a serving tray. The frame is so constructed and arranged as to occupy a minimum space when the tray is detached and to provide a firm and steady support when the tray is attached.

Yet another object of this invention is to provide a tray support of this kind, having a swingably depending plate mounted on the front edge for engagement by a depending leg of the removable tray to support the tray in the desired horizontal position. As the plate is disposed in a conspicuous position in the vehicle and is only slightly obscured by engagement of the tray supporting leg, the plate provides a desirable medium for advertising and the like.

A further object of this invention is to provide a tray support for use within a vehicle, the support being made of wire or other suitable material whereby it may be readily adapted and engaged on the backs of vehicle seats of various formations and configurations.

With the above and other objects in view, my invention consists in the arrangement, combination and details of construction disclosed in the drawings and specification, and then more particularly pointed out in the appended claims.

In the drawings:

Figure 1 is a front elevation showing the tray and tray support of my invention applied and supported on the front seat of an automobile.

Figure 2 is a top plan view.

Figure 3 is a vertical section taken on the line 3—3 of Figure 1.

Referring to the drawings, the numeral 10 designates generally a supporting member for engagement over the backs of the seats of an automobile, or the like, for supporting a serving tray as 11. In the use of serving trays for curb service for vehicle occupants, it is customary to support the serving tray on the edge of the door window, and in removing articles of food from the tray it is necessary for the occupants of the vehicle to reach from their seated position to the window and door from which the tray is supported. By using a supporting member 10, as constructed according to an embodiment of this invention, the serving tray, as 11, may be supported within the automobile so that the tray will be closely adjacent to the occupants and the materials or articles, as articles of food, may be readily reached by the occupants when, and as desired.

The supporting member 10 is made of wire bent upon itself to the desired configuration. In the preferred embodiment of this invention, a suitable length of wire is bent upon itself to provide a pair of inverted U-shaped brackets 12 and 14 for engagement over the upper edge of the back of an automobile seat. The brackets 12 and 14 are connected together by a connecting bar as 15 which is engaged with or formed integral with the lower end of the forward arms of the brackets 12 and 14.

Each of the brackets 12 and 14 are formed with a pair of divergently related side arms 16 and 17 connected together at their convergent end by an upper bight member 18. The rearmost arm 17 is relatively short, for extension downwardly along the rear surface of the back of the seat to provide a suitable engagement of the brackets with the back of the seat. The lower end of the rear arms 17 may be returned to form a loop as 19, clearly shown in Figure 3 of the drawing, in order to eliminate a sharp edge at this point. As the lower end of the rear supporting arms 17 extends downwardly and rearwardly from the upper edge of the back of the seat, it is desirable to provide a smooth end on the arm in order to prevent the free end of this arm from engaging the clothes of persons seated in the back of the vehicle. The downwardly extending forward arms 16 of the brackets 12 and 14 extend a considerable distance down on the forward surface of the back of the seat for supporting the tray 11 at a desired level so that the occupants of the seat may readily reach the articles supported on the tray.

The connecting bar 15 formed integral with the lower end of the forward arms 16, of the brackets 12 and 14, connects the brackets together, and provides a means for supporting the tray 11. The center portion of the connecting bar 15 is disposed in substantial planar alignment with the lower ends of the arms 16 of the brackets 12 and 14. The opposite ends of the connecting bar 15, adjacent the connection to the arms 16, are forwardly offset, in a manner to provide for the engagement of the hooks carried by the tray 11, to be described hereinafter. The intermediate portion of the connecting bar 15, designated by the numeral 20, engages the forward surface of the back of the seat and the forwardly extending portions 21 and 22 between the intermediate portion 20 and the arms 16 of the brackets 12 and 14, are connected to the intermediate bar by forwardly extending arms 24 and 25, respectively. The outer ends of the forwardly offset bars 21 and 22 are connected to the lower end of the forward arms 16 of the brackets 12 and 14, by rearwardly extending arms 26 and 27 respectively.

For use with the supporting bracket 10, I have provided a tray 11 particularly adapted for engagement with the forwardly extending portions 21 and 22 of the supporting member. The tray 11 is formed of a flat base as 26', having a peripheral upstanding flange 27'. A supporting bar as 28 is fixed on the lower surface of the plate or base 26 at each end thereof and extends outwardly beyond the front and rear edges. The extensions of the braces 28 beyond the front and rear edge of the base 26' of the tray are turned downwardly to form a hook as indicated by the numeral 29 in the drawings. The downwardly extending hooks 29 are spaced outwardly from the front and rear edges of the tray 11 so that when the hooks 29 are engaged with the supporting member the body of the tray 11 will be disposed forwardly of the support, and forwardly of the back of the seat. A bracing leg as 30 is fixed to the lower surface of the base 26' of the tray 11 and is downwardly and rearwardly inclined, as clearly shown in Figure 3 of the drawings for engagement with a vertical surface below the supporting bracket 10, in order to prevent the swinging movement of the tray 11 about the engagement of the hooks 29 with the forwardly extending portions 22 of the supporting member 10.

In order to provide a suitable support for the lower end of the supporting brace, or leg 30, I have provided a depending plate as 31, which may be swingably mounted on the connecting bar 15 below the supporting member 10. The plate 31 may be hingedly supported on the intermediate portion 20 of the connecting bar 15 by wire loops as 32 which engage about the intermediate bar 20 and through openings as 34 in the upper edge of the plate 31.

In the use and operation of the supporting member 10 described above, with the tray 11 removed therefrom, the supporting member 10 may be disposed within an automobile and the arms 17 of the brackets 12 and 14 engaged over the upper end of the backs of the automobile seats. The downwardly extending forward arms 16 will engage over the forward surface of the backs of the seats and the swingable plate 31 may be disposed in its depending position. When the supporting member 10 is used on the front seat, the plate 31 may be disposed over the separation between the adjacent front seats, as shown in Figure 1 of the drawings. The tray 11 is attached to the supporting member 10 by initially engaging the rear hooks 29 rearwardly of the forwardly offset bars 21 and 22 at the opposite ends of the connecting bar 20. The lower end of the downwardly and rearwardly inclined supporting brace 30 is adapted to engage the forward surface of the depending plate 31, to support the tray 11 in a substantially horizontal position for supporting articles thereon. I do not mean to confine myself to the exact details of construction herein disclosed, but claim all variations falling within the purview of the appended claims.

Having thus described my invention, what I claim is:

1. A supporting member for a tray having depending hooks on one edge thereof and a downwardly and rearwardly inclined bracing leg, comprising a pair of inverted U-shaped brackets for engagement over the back of an automobile seat, a connecting bar fixed between said brackets, spaced members on said connecting bar for engagement with the hooks of said tray, and a depending plate swingably mounted on said connecting member for engagement with said bracing leg of said tray, for supporting said tray on the back of the automobile seat.

2. A support of the kind described for a tray having a pair of hooks on one edge thereof and a downwardly and rearwardly inclined supporting brace comprising a pair of spaced apart inverted U-shaped brackets for engagement over the back of an automobile seat, a connecting bar fixed between said brackets on one side thereof, a pair of spaced apart hook engaging members on said connecting bar, and a depending plate carried by said connecting bar between said latter members for supporting the brace of said tray below said hooks.

3. In combination, a tray supporting member including a pair of spaced brackets engageable over the upper edge of the back of an automobile seat, a connecting bar between said brackets, a serving tray including a downwardly and rearwardly inclined brace, a depending plate on said connecting bar for engagement with said brace, and correlated interengaging fastening means carried by said tray and said connecting bar for releasably securing said tray on said supporting member.

4. A supporting member of the kind described comprising a pair of spaced apart inverted U-shaped brackets for engagement over the back of an automobile seat, a connecting bar between the lower ends of the forward arms of said brackets, said connecting bar including a pair of forwardly offset hook engaging members adjacent the ends thereof for engagement with hooks on a tray to be supported thereon, and a depending plate swingable on said connecting bar between said hook engaging members for engagement with a downwardly and rearwardly inclined brace depending from said tray below said hooks.

LLOYD F. HEDGER.

No references cited.